Figure 1:
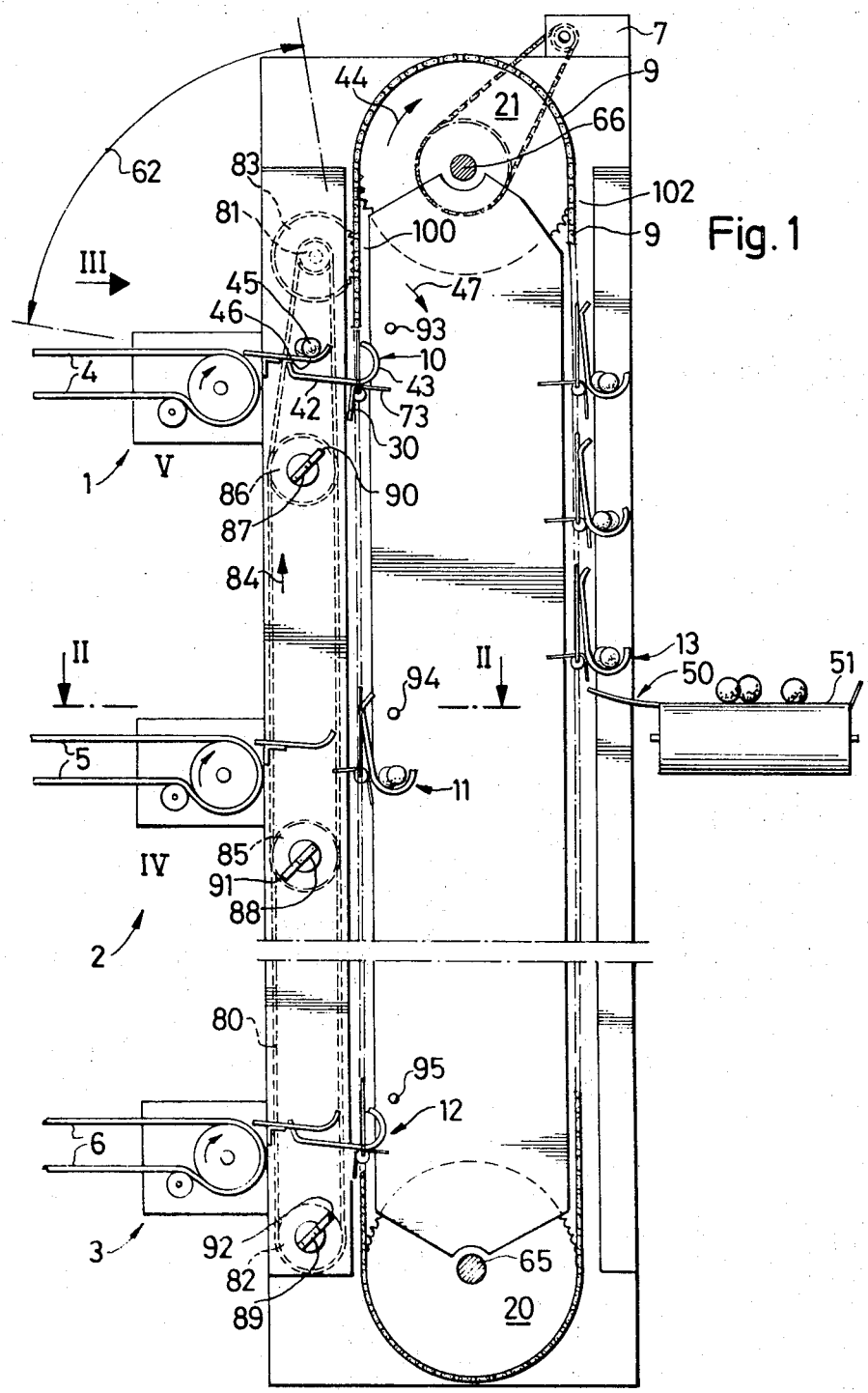

United States Patent [19]

Michelbach

[11] 3,770,107
[45] Nov. 6, 1973

[54] DEVICE FOR CONVEYING OR TRANSFERRING EGGS

[76] Inventor: Alfons Michelbach, Goethestrasse 1, 699 Bad Mergentheim, Germany

[22] Filed: Sept. 14, 1972

[21] Appl. No.: 289,061

[30] Foreign Application Priority Data
Nov. 22, 1971  Germany.................. P 21 57 774.2

[52] U.S. Cl.................. 198/157, 198/156, 198/177
[51] Int. Cl............................................. B65g 17/00
[58] Field of Search...................... 198/157, 177, 156, 198/158

[56] References Cited
UNITED STATES PATENTS
3,613,927   10/1971   Carlier et al.......................... 198/177
2,858,763   11/1958   Bloom................................. 198/157
1,086,398    2/1914   Renner................................ 198/157

FOREIGN PATENTS OR APPLICATIONS
2,831   12/1904   Great Britain...................... 198/156
445,769   4/1936   Great Britain...................... 198/156

Primary Examiner—Richard E. Aegerter
Assistant Examiner—Joseph E. Valenza
Attorney—Karl F. Ross

[57]  ABSTRACT

An egg transferring or collecting device for collecting eggs from several superimposed channels and conveying them to a single channel comprises a main vertical endless chain conveyor with a number of baskets in the form of multi-tine forks, the baskets being pivoted so as to occupy either a "collect" position or a "deliver" position, both positions being stable. On the "up" moving side of the chain each basket is tipped to a collect position at a respective channel, and whether eggs are collected there or not, thereafter tipped to a deliver position. From this position eggs are collected at a collecting station during the downward movement of the chain and transferred to a belt conveyor.

6 Claims, 3 Drawing Figures

DEVICE FOR CONVEYING OR TRANSFERRING EGGS

The present invention concerns a device for the conveyance or transfer of eggs or the like small fragile objects, comprising an endless conveyor chain, belt or the like circulating in a vertical plane of rotation on which conveyor members are provided. These are formed by rake teeth parallel with each other and with the plane of circulation, said teeth rising through superposed delivery stations formed by further rake teeth extending towards the conveyor and descending through a receiving station including rake teeth extending towards the conveyor.

In a conventional device of this kind, the conveyor elements are outwardly directed bars which are rigidly secured to the conveyor chain. These bars, extending radially outwardly, pivot about the upper guide pulley of the conveyor chain and the eggs resting on top of the bars roll from the top of the bar, by which they have been raised, onto the back of the bar located ahead of it in the direction of travel and on which they rest during the downward movement.

In the case of devices of the above-mentioned kind, the eggs can be handled very carefully as they are transferred from the delivery station to the conveying baskets and from the conveying baskets to the receiving station, since the teeth pass through each other during transfer.

It is an object of the present invention to provide a device of the above-mentioned kind in such manner that the eggs can also be carefully treated in the conveying members.

According therefore to the present invention there is provided a device for transferring eggs or like small fragile objects, said device comprising an endless conveyor chain, belt or the like which circulates in a vertical plane and is provided with conveyor elements including rake teeth which are parallel to each other and to the plane of circulation and, during the rising movement of the chain, pass through the bottoms of superimposed delivery stations, said bottoms being also formed or rake teeth parallel to the conveyor element teeth and pointing towards the conveyor, the conveyor teeth passing through the bottoms of a receiving station during the descending movement, formed of rake teeth extending parallel thereto towards the conveyor, wherein the conveyor elements are conveyor baskets, each of which has a receiving compartment and a delivery compartment, said compartments being inclined towards each other approximately at right angles in the plane of circulation, open at the top, and formed by rake teeth, each tooth extending smoothly between both compartments, the conveyor baskets being each suspended from the conveyor chain to pivot between stops about a horizontal axis extending perpendicularly to the plane of circulation, said pivoting movement being between a receiving position in which the receiving compartment extends approximately horizontally outwardly and the delivery compartment approximately vertically upwardly, and a delivery position in which the receiving compartment extends approximately vertically upwardly and the delivery compartment approximately horizontally outwardly, the pivoting action being effected by changeover cranks associated with the delivery stations which pivot selected conveyor baskets forwardly into their receiving positions, before the appropriate associated delivery station is reached, and are pivoted back into their delivery positions by stops after passing through the appropriate delivery station and before reaching the next delivery station.

During their time on the transfer device the eggs remain on the same basket bottom and slide and roll very gently on the rake teeth from their receiving compartment into their delivery compartment, this movement also being very gentle, because it extends only over a short distance, determined by the formation of the conveying baskets.

The invention also ensures that, during the transfer, several eggs do not simultaneously reach the same position on the same conveying basket, for as soon as a basket has passed through a delivery station to the receiving position, and has received any egg therein, it pivots into its delivery position in which it cannot receive any more eggs, even if it still passes other delivery stations in which eggs are held ready.

According to a feature of the present invention displaceable changeover switches for pivoting forwardly are associated with a delivery station and are operated synchronously for circulating the conveyor chain and reach their operating position effecting the forward pivoting only for selective baskets clearly associated with this delivery station. Each basket is therefore always associated with only one particular receiving station and it moves into the receiving position only for this receiving station. The existing baskets can be uniformly distributed over the delivery stations; however, one or more delivery stations can be favourably influenced by being associated with a comparatively large number of baskets, which is preferable when these delivery stations deliver a very large quantity of eggs.

The displaceable changeover switch may be of magnetically operated element, but a mechanical formation of all the changeover switches is simpler and is characterised in that the changeover switches have crank members for the forwardly pivoting operation and are driven to rotate by a drive derived from the conveyor chain drive and that the changeover switches for swinging back are stationary elements and that these elements cooperate with adjusting levers which are secured to the basket and in the path of which they are disposed during the pivoting process.

Figure 2:
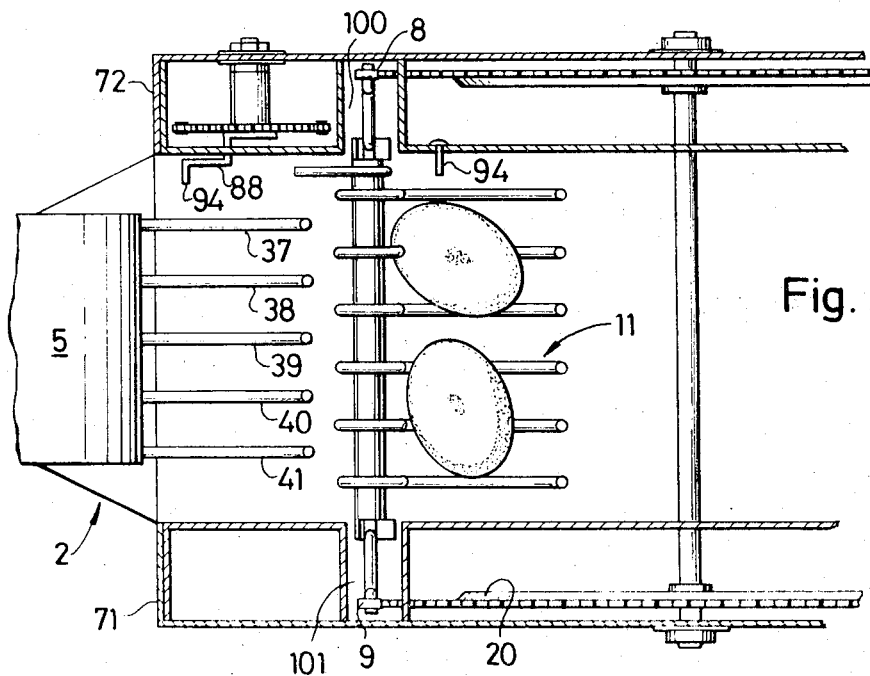
Figure 3:
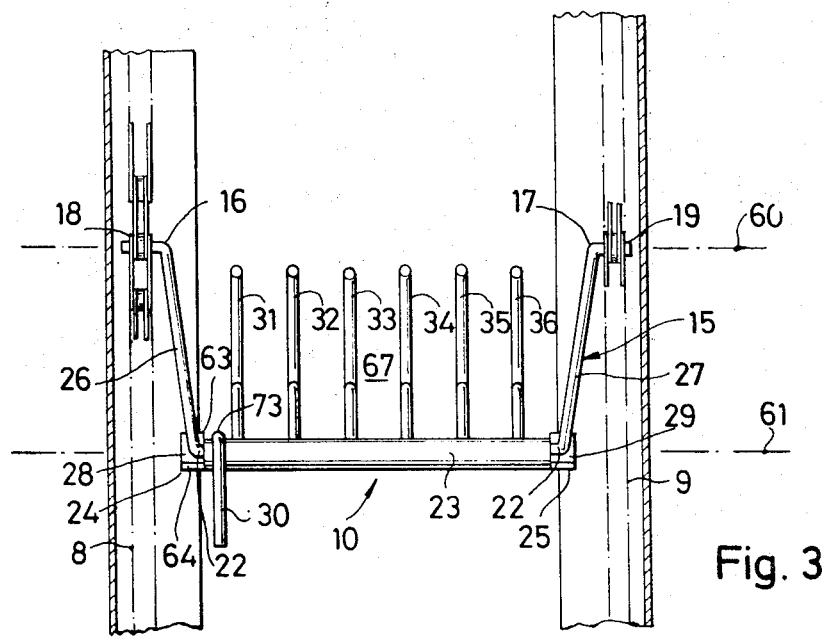

The present invention will be described in greater detail hereinafter with reference to the accompanying drawings, in which:

FIG. 1 shows a side view of a conveyor transfer device according to the present invention, the side walls facing the viewer being omitted, FIG. 2 is a partial section taken on the line II of FIG. 1, on a somewhat magnified scale, and FIG. 3 viewed in the direction of the arrow III in FIG. 1, shows a conveying basket on the same scale as in FIG. 2.

According to FIG. 1, three delivery stations are indicated by 1, 2 and 3; they are arranged one above the other at the ends of conveyor belts 4, 5 and 6. The conveyor belts 4, 5, 6 have horizontal upper runs on which the eggs on a respective floor of a laying battery (not shown) are conveyed to an appropriate delivery station. In the drawings, only three delivery stations are shown, but in practice more delivery stations may be provided, one above the other. The delivery stations are located near two parallel conveyor chains 8, 9 which are driven in a vertical plane so as to circulate in the direction of the arrow 44 by a driving motor 7. Conveying baskets 10 - 13, suspended at uniform spaced intervals, hang from the conveying chains 8, 9. In FIG. 1, a total of only six such baskets are shown, but in practice many more baskets, thirty for example, may be suspended from the conveyor chains. These baskets are identical with each other. As may be seen from FIG. 3, the basket 10 has a U-shaped carrying stirrup of wire of circular cross section, the free ends 16, 17 of which are angled and inserted in openings 18, 19 in the links of the chains 8, 9. The openings 18, 19 are circular and large enough so that the ends 16, 17 can rotate freely therein. The stirrup 15 hangs downward like a swing from the openings 18 and 19 and can rock or swing about the axis 60 which is co-axial with the axis of the openings 18, 19 and is parallel to the axles 65, 66 of the sprockets 20, 21. A tube 23 is slipped on the straight cross piece 22 of the stirrup 15. It extends at both ends 24, 25 beyond the shanks 26, 27 of the stirrup 15 and is provided there with incisions 28, 29 for these shanks 26, 27 to limit the swinging movement of the tube 23 on the cross piece 22 about the swivel axis 61 cross piece. The movement is limited to an angle 62 of approximately 90°, the edges of the tube acting as stops 63, 64 for the shank 26 located on the same side. Six curved rake teeth over which plastic covers (not shown) are slipped, are welded to the tube 23 so that they have a smooth surface which can be easily cleaned. Two adjusting arms 30, 73 are also welded to the tube 23 and between them subtend an angle of approximately 90°, as may be seen in FIG. 1. The rake teeth 31-36 extend parallel to each other and to the gaps between the five rake teeth 37 – 41 of the delivery station 2. The other delivery stations 1 and 3 also have five rake teeth, exactly the same as the other delivery stations (not shown) and these five rake teeth are disposed exactly over the five rake teeth of the delivery station 2. The rake teeth 31 - 36 are therefore parallel with the gaps of the rake teeth in all the delivery stations and this applies to all the baskets, so that the rake teeth of the baskets can pass through any delivery station.

The rake teeth 31 – 36 with the tube 23 form the bottom 67 of the basket 10. It is divided into a receiving compartment 42 and a delivery compartment 43 which merge uniformly into each other. In one end position of the basket about the axis 61, (limited by the stop 64) in which position the basket 10 is shown in FIG. 1, the receiving compartment 42 extends approximately horizontally, and slightly slanting in the direction of the arrow III. The baskets are balanced so that the bottom 67 is kept in this receiving position in which the basket 10 is shown, as long as it is not loaded. As soon as the basket 10, in the course of its rising movement in the direction of the arrow, passes upwardly through a delivery station 1, it receives in its receiving compartment any egg 45 which has arrived from the conveyor belt 4, this egg being held in a trough 46 at the delivery station 1. Owing to the inclined position of the receiving compartment 42 with respect to the direction shown in FIG. 1, the egg then slides or rolls to the right towards the delivery compartment 43 until the basket 47 becomes overweighted and swings in the direction of the arrow 47 through approximately 90° into its delivery position which is defined by the stop 63. The conveyor baskets 11 and 13 are shown in this delivery position, each loaded with an egg. In the receiving position, the receiving compartment 42 extends approximately horizontally with the said slight degree of slant, whilst the delivery compartment 43 extends approximately vertically, determined by the approximate right angle 62 which is open at the top and which the two compartments 42 and 43 subtend with each other. In the delivery position the receiving compartment 42 extends approximately vertically upwardly, whilst the delivery compartment 43 extends approximately horizontally to the right, relative to FIG. 1. Baskets loaded with eggs are all in this delivery position and in this position the delivery compartment 43 extends through the five rake teeth of a delivery station 50 arranged to coincide with the gaps in the path of the rake teeth 31 to 36, each station sloping slightly to the right with reference to FIG. 1. Here eggs are rolled onto a conveyor belt moving at right angles to the plane of FIG. 1. The receiving station 50 is traversed by the delivery compartments of the loaded baskets moving downwardly from top to bottom, so that the eggs can be removed from the loaded baskets by the rake teeth of the delivery station 50 and slide onto the belt 51 by which they can be conveyed away for packing.

An endless chain 80 extends over two sprockets 81, 82. A further sprocket 83 meshing with the conveyor chain 80 is fastened on the axle of the sprocket 81. The conveyor chain 80 is driven in the direction of the arrow 84 with a speed half that of the conveyor chains 8 and 9. In addition to the sprocket 82, other chain wheels 85, 86 are also driven. Cranks 87 - 89 which when in operation are driven by the chain 80 are fastened to the chain wheels 82, 85 and 86, and rotate about axles parallel to the axles 65, 66, in an anticlockwise direction, as viewed in FIG. 1. With each rotation the ends 90, 91, 92 of the cranks pass once through an operating position in which they are disposed in the path of the adjusting arm 30 of the conveyor baskets, provided an appropriate basket is in the delivery position. If a crank end comes into contact with an adjusting arm of a basket in the delivery position, this basket is tilted into the receiving position. Each of the cranks 87 - 89 comes into the operating position at the correct moment for every third basket, in order to tilt the particular basket into the receiving position. The cranks 87 - 89 are phased so that they come into action on different baskets. For each delivery station a crank 87, 88, 89 is provided just below the delivery station so that a basket pivoted forwardly passes the particular delivery station in the receiving position. On the basis of 30 conveyor baskets which are numbered from 1 to 30, and on the basis of three delivery stations 1 – 3, then the crank 87, for example, is only operative in the case of those baskets whose ordinal number is divisible by three, whilst the crank 88 is operative in the case of baskets, whose ordinal number is divisible by three with a remainder of one, and the crank 89 is operative in the case of baskets whose ordinal number is divisible by three with a remainder of 2. A return swivel pin 90 – 92 is provided directly above each delivery station 1 – 3, in the path of the adjusting arm 73 of the baskets in the receiving position. If a basket in the receiving position moves upwardly past such a return swivel pin 90 – 92, then the return swivel pin engages the adjusting arm 73 and/or the corresponding adjusting arm of the other basket, and swings it out of its receiving position into its delivery position. If the basket is already in the delivery position, the appropriate return pin 93 - 95 is ineffective. In this manner the baskets are always in the delivery position as they circulate further, as shown by the baskets 11 and 13. Only just before a basket reaches the delivery station 1, 2 or 3 clearly associated therewith, is it pivoted by the appropriate crank 87, 88, 89 into the receiving position to empty the particular station; directly afterwards, before it can reach the next station, it is pivoted by the return pin 93, 94 or 95 back into the delivery position. Each basket passes through only one delivery station 1, 2 or 3 in the receiving position, and passes the others in the delivery position as it circulates.

The device is assembled in a housing comprising two side walls 71, 72 bent from shaped sheet metal, in which the shafts for the sprockets 20, 21 and the shafts of the wheels 81, 82, 83 and the cranks 87, 88, 89 are journalled. In addition, a total of four vertical inwardly open channels 100 - 102 are formed in the profiled metal sheet, in which channels the four lengths of the two conveyor chains 8 and 9 run. Deflections of the conveyor chain due to operational vibrations or transverse forces exerted by the baskets, are thus limited. The return pins 93, 94 and 95 are secured in one side wall 72.

I claim:

1. A device for transferring eggs or like small fragile objects, said device comprising an endless conveyor chain which circulates in a vertical plane, a plurality of conveyor elements with parallel rake teeth pivoted on said conveyor, a plurality of superimposed stationary delivery stations with bottoms also formed of rake teeth parallel to said conveyor element teeth and pointing toward said conveyor, said conveyor elements passing through said delivery stations during a rising movement of said chain, a receiving station including rake teeth extending parallel towards said conveyor chain, said conveyor element teeth passing through said receiving station teeth during the chain descending movement wherein said conveyor elements are conveyor baskets, each of which has a receiving compartment and a delivery compartment, said compartments being inclined towards each other approximately at right angles, open at the top and formed by said teeth, said conveyor baskets being each suspended from said conveyor chain to pivot between stops about a horizontal axis extending perpendicularly to the plane of circulation of said chain, said pivoting movement being between a receiving position in which said receiving compartment extends approximately horizontally outwardly from said chain and said delivery compartment extends approximately vertically upwardly, and a delivery position in which said receiving compartment extends approximately vertically upwardly and said delivery compartment approximately horizontally outwardly, and changeover cranks associated with said delivery stations to pivot selected conveyor baskets forwardly into their receiving positions, before a respective delivery station is reached, stops to pivot said baskets back into their delivery positions after passing through said respective delivery station and before reaching the next delivery station.

2. A device as recited in claim 1, wherein said cranks are each associated with a respective delivery station, means for driving said cranks synchronously with said conveyor chain to move into an operative position effecting said forward pivoting of selected conveyor baskets associated with the respective delivery station.

3. A device as recited in claim 2, wherein said cranks are driven by a drive derived from said conveyor chain, said stops being stationary elements, and adjusting arms secured each to said conveyor basket and acted upon by said cranks and stops.

4. A device as recited in claim 1, wherein an empty conveyor basket is held by its centre of gravity in its receiving position, said receiving compartment forming, in said receiving position, an inclined plane sloping towards said delivery compartment, said basket when loaded being urged into a delivery position by a change in the position of said centre of gravity.

5. A device as recited in claim 3, wherein each conveyor basket comprises a U-shaped carrier stirrup having free outwardly angled ends engaged in opposed members of a double conveyor chain so as to allow said basket to swing about an axis coaxial with said angled ends, and a tube slipped on the horizontal freely swinging straight cross-piece of said carrying stirrup, to which tube said rake teeth and said adjusting arms are secured, the tube projecting at least on one side beyond the ends of said carrier stirrup, to define a gap, and stops engaging in said gap to limit the rotation of said tube.

6. A device as recited in claim 5, wherein the links of said conveyor chain define circular openings therearound, said carrier stirrup being bent from wire having a circular cross-section so as to be freely rotatable in said openings.

* * * * *